US00RE47196E

(19) United States
(12) Reissued Patent
Cho et al.

(10) Patent Number: US RE47,196 E
(45) **Date of Reissued Patent: *Jan. 8, 2019**

(54) LIQUID CRYSTAL PANEL ASSEMBLY AND LIQUID CRYSTAL DISPLAY APPARATUS HAVING THE SAME

(71) Applicant: SAMSUNG ELECTRONICS CO., LTD., Suwon-si (KR)

(72) Inventors: Jin-hyun Cho, Seoul (KR); Joon Kang, Seoul (KR)

(73) Assignee: SAMSUNG ELECTRONICS CO., LTD., Suwon-si (KR)

( * ) Notice: This patent is subject to a terminal disclaimer.

(21) Appl. No.: 14/876,369

(22) Filed: Oct. 6, 2015

Related U.S. Patent Documents

Reissue of:
(64) Patent No.: 8,115,887
Issued: Feb. 14, 2012
Appl. No.: 12/953,745
Filed: Nov. 24, 2010

U.S. Applications:
(60) Division of application No. 14/181,299, filed on Feb. 14, 2014, which is an application for the reissue of
(Continued)

(30) Foreign Application Priority Data

Mar. 13, 2006 (KR) ..... 10-2006-0023068

(51) Int. Cl.
*G02F 1/1333* (2006.01)
*G02F 1/1335* (2006.01)
*F21V 8/00* (2006.01)

(52) U.S. Cl.
CPC ..... *G02F 1/133615* (2013.01); *G02B 6/0073* (2013.01); *G02B 6/0085* (2013.01);
(Continued)

(58) Field of Classification Search
CPC ..... G02B 6/0076; G02B 6/0085; G02F 1/133308; G02F 1/133615;
(Continued)

(56) References Cited

U.S. PATENT DOCUMENTS 5,659,376 A 8/1997 Uehara et al.
6,473,146 B1 10/2002 Lee
(Continued)

FOREIGN PATENT DOCUMENTS

CN 1399160 A 2/2003
CN 1515937 A 7/2004
(Continued)

OTHER PUBLICATIONS

Decision to Refuse dated Nov. 4, 2016, issued by the European Patent Office in counterpart European Application No. 14171255.4.
(Continued)

*Primary Examiner* — Norca L. Torres Velazquez
(74) *Attorney, Agent, or Firm* — Sughrue Mion, PLLC

(57) ABSTRACT

A liquid crystal panel assembly includes a liquid crystal panel, a backlight module having at least one light emitting diode (LED) light source to irradiate light to the liquid crystal panel, and a housing which surrounds the liquid crystal panel and the backlight module. At least a portion of the housing adjacent to the at least one LED light source is formed of a thermal-conductive material.

8 Claims, 5 Drawing Sheets

Related U.S. Application Data

Pat. No. 8,115,887, which is a continuation of application No. 11/652,009, filed on Jan. 11, 2007, now Pat. No. 7,864,258.

(52) U.S. Cl.
CPC ..... *G02F 1/133308* (2013.01); *G02F 2001/133314* (2013.01); *G02F 2001/133317* (2013.01); *G02F 2001/133334* (2013.01); *G02F 2001/133628* (2013.01)

(58) Field of Classification Search
CPC ..... G02F 2001/13334; G02F 2001/133317; G02F 2001/133314
USPC ..... 349/58, 65, 612
See application file for complete search history.

(56) References Cited

U.S. PATENT DOCUMENTS

| | | | | |
|---|---|---|---|---|
| 6,697,130 | B2 | 2/2004 | Weindorf et al. | |
| 6,930,737 | B2 | 8/2005 | Weindorf et al. | |
| 7,092,048 | B2 | 8/2006 | Jeong | |
| 7,161,650 | B2 | 1/2007 | Hirano | |
| 7,193,248 | B2 | 3/2007 | Weindorf et al. | |
| 7,220,040 | B2 | 5/2007 | Lengyel et al. | |
| 7,336,494 | B2 | 2/2008 | Nishimura et al. | |
| 7,488,104 | B2 | 2/2009 | Hamada et al. | |
| 7,513,661 | B2 | 4/2009 | Hamada et al. | |
| 7,626,672 | B2 | 12/2009 | Song | |
| 7,649,590 | B2 * | 1/2010 | Park et al. | 349/65 |
| 7,728,918 | B2 | 6/2010 | Sakurai | |
| 7,750,990 | B2 | 7/2010 | Jeong | |
| 2002/0041482 | A1 | 4/2002 | Sun et al. | |
| 2003/0016313 | A1 | 1/2003 | Jeong | |
| 2003/0118805 | A1 | 6/2003 | Kretman et al. | |
| 2005/0088586 | A1 * | 4/2005 | Mori et al. | 349/62 |
| 2005/0094052 | A1 | 5/2005 | Sakurai et al. | |
| 2005/0213924 | A1 | 9/2005 | Sakurai et al. | |
| 2006/0033860 | A1 | 2/2006 | Okishiro et al. | |
| 2006/0227981 | A1 | 10/2006 | Miyata | |
| 2006/0274224 | A1 | 12/2006 | Jeong | |
| 2007/0114010 | A1 | 5/2007 | Upadhya et al. | |
| 2007/0121023 | A1 | 5/2007 | Yang | |
| 2007/0153155 | A1 | 7/2007 | Chung et al. | |
| 2009/0059130 | A1 * | 3/2009 | Kim et al. | 349/65 |

FOREIGN PATENT DOCUMENTS

| | | | |
|---|---|---|---|
| CN | 1598660 | A | 3/2005 |
| CN | 1713042 | A | 12/2005 |
| JP | 8-248900 | A | 9/1996 |
| JP | 2002091330 | A | 3/2002 |
| JP | 2004-69825 | A | 3/2004 |
| JP | 2004-186004 | A | 7/2004 |
| JP | 2005084270 | A | 3/2005 |
| JP | 2005338178 | A | 12/2005 |
| JP | 2006-11242 | A | 1/2006 |
| JP | 2006066328 | A | 3/2006 |
| KR | 10-2003-0079777 | A | 10/2003 |

OTHER PUBLICATIONS

Communication under Rule 71(3) EPC dated Jan. 24, 2014 issued by the European Patent Office issued in corresponding European Patent Application No. 06077004.7.

Communication dated Nov. 6, 2014, issued by the European Patent Office in counterpart European Application No. 14171255.4.

Communication dated Mar. 25, 2015, issued by the European Patent Office in counterpart European Application No. 14171255.4.

Communication dated Jul. 5, 2016 issued by European Patent Office in counterpart European Patent Application No. 14171255.4.

Communication dated Jul. 26, 2017, issued by the European Patent Office in counterpart European Patent Application No. 17167616.6.

Jun. 28, 2010 Communication from the State Intellectual Property Office of P.R. China in counterpart Chinese Application No. 200610165990.X.

Communication dated Aug. 4, 2011 from the European Patent Office in counterpart European application No. 06077004.7.

* cited by examiner

LIQUID CRYSTAL PANEL ASSEMBLY AND LIQUID CRYSTAL DISPLAY APPARATUS HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This] *More than one reissue application has been filed for the reissue of U.S. Pat. No. 8,115,877, filed as U.S. application Ser. No. 12/953,745, which* is a Continuation application of application Ser. No. 11/652,009, filed Jan. 11, 2007, which claims the benefit under 35 U.S.C. §119 from Korean Patent Application No. 10-2006-23068, filed on Mar. 13, 2006, in the Korean Intellectual Property Office[, the entire contents of which are incorporated herein by reference]. *The reissue applications are the present application, and U.S. application Ser. No. 14/181,299, filed on Feb. 14, 2015, in the U.S. Patent and Trademark Office. The present application is an application for reissue of U.S. Pat. No. 8,115,887, and is a divisional of U.S. application Ser. No. 14/181,299, which is also an application for reissue of U.S. Pat. No. 8,115,887.*

BACKGROUND OF THE INVENTION

1. Field of the Invention

Apparatuses consistent with the present invention relate to a liquid crystal display (LCD) apparatus using a light emitting diode (LED) as a light source.

2. Description of the Related Art

A liquid crystal display (LCD) apparatus is a kind of flat panel display (FPD) apparatus, which converts various electric information generating from all sorts of devices into visual information by using a change of transmissivity in a liquid crystal according to a voltage applied thereto and displays it. Contrary to a cathode ray tube (CRT) display apparatus, the FDP apparatus needs a backlight because it does not have a self-luminosity. However, the FDP apparatus consumes little electric power and can be used in a portable type device because it is driven with a low driving voltage. Thus, the FDP apparatus is widely used in a watch, a TV, a monitor for computer, etc.

Such a LCD apparatus usually includes a liquid crystal panel, and a backlight module arranged adjacent to the liquid crystal panel.

The liquid crystal panel is provided with a pair of substrates arranged in a minutely spaced-apart relation to each other, a liquid crystal interposed in a space between the substrates, and a driving circuit to drive the liquid crystal.

According to a method of driving the liquid crystal, the liquid crystal panel is classified into an active matrix type to drive a pixel capacity by using switch elements, a passive matrix type to drive a pixel capacity without using switch elements, etc.

Particularly, the active matrix type liquid crystal panel can be further classified into a type using three terminal type switch elements such as thin film transistors (TFT), a type using two terminal type switch elements such as thin film diodes (TFD), etc.

The backlight module is provided with a light guide plate arranged adjacent to the liquid crystal panel, and a light source to irradiate light to the light guide plate. Light conveyed to the light guide plate from the light source is guided to the liquid crystal panel through a diffusing plate and/or a prism.

A fluorescent lamp, such a cold cathode fluorescent lamp (CCFL), an external electrode fluorescent lamp (EEFL), etc., is usually used as the light source of the backlight module. However, the fluorescent lamp is disadvantageous in that a lifespan is shortened due to a change of gas pressure in plasma, an inverter is required to realize a high driving voltage of several hundred volts necessary for plasma discharge, and a consumption efficiency of electric power is low.

Accordingly, recently a light emitting diode (LED) is in the spotlight as the light source for use in the backlight module. The LED is a light emitting element, which produces light by a light emitting phenomenon generating when a voltage is applied to a semiconductor. The LED is advantageous in that as compared with the conventional light source such as a fluorescent lamp, a size is relatively small, a lifespan is guaranteed for a relatively long time, an energy efficiency is relatively high since an electric energy is directly converted into a light energy, and a relatively low driving voltage is required.

However, when the LED is used as the light source for the backlight module in the LCD apparatus, it is disadvantageous in that due to heat of high temperature generating while the LED is operated, the liquid crystal panel is subject to a negative influence and a light emitting performance of the LED itself is deteriorated. Accordingly, recently, there have been developed and disclosed various types of heat emitting structures, which can effectively emit the heat from the LED.

FIG. 1 is a side section view exemplifying a related art LCD apparatus.

As shown in the drawing, the related art LCD apparatus includes a liquid crystal panel 1, a backlight module 2 to irradiate light to the liquid crystal panel 1, a controller 3 to drive the liquid crystal panel 1 and the backlight module 2, and a frame 4 to which the liquid crystal panel 1 and the backlight module 2 are mounted.

A driving circuit board (not shown) for liquid crystal is connected to the liquid crystal panel 1.

The backlight module 2 includes a LED light source 5. The LED light source 5 is provided with a plurality of LEDs 5a, and a circuit board 5b on which the plurality of LEDs 5a are mounted.

At a rear side of the LED light source 5 is arranged a heat radiating member 7 having a plurality of heat radiating pins 7a. The heat radiating member 7 emits heat generating from the LED light source 5 to the outside.

The controller 3 includes a power supply, an inverter, a main control board, all sorts of electric elements and sensors, etc., which are not shown in the drawing, and controls a whole operation of the LCD apparatus. The frame 4 is provided with a front frame part 4a to which the liquid crystal panel 1 is mounted, and a rear frame 4b arranged behind the front frame part 4a.

Between the frame 4 and the backlight module 2 are arranged a first shield 8 to surround the backlight module 2 and the liquid crystal panel 1, and a second shield 9 to surround the controller 3.

The first and the second shields 8 and 9 are made of an electric-conductive material so as to shield all sorts of electromagnetic waves generating from the backlight module 2 and the controller 3.

However, such a related art LCD apparatus is disadvantageous in that the heat radiating member 7 used for emitting the heat of high temperature generating from the LED light source 5 occupies a large installation space, thereby increasing a size of the LCD apparatus.

Further, the related art LCD apparatus is disadvantageous in that there is no heat radiating structure to emit all sorts of heat of high temperature generating from the controller 3, thereby deteriorating a display quality of the LCD apparatus.

Also, the related art LCD apparatus is disadvantageous in that there is installed a shield structure such as the first and the second shields 8 and 9 to intercept the electromagnetic waves generating from the backlight module 2 and the liquid crystal panel 1, thereby increasing the number of assembling parts and processes and enlarging a volume of the LCD apparatus.

SUMMARY OF THE INVENTION

Exemplary embodiments of the present invention address at least the above problems and/or disadvantages. Accordingly, an aspect of the present invention is to provide a liquid crystal panel assembly and a liquid crystal display (LCD) apparatus having the same, which can realize a more-compacted size.

Another aspect of the present invention is to provide a liquid crystal panel assembly and a LCD apparatus having the same, which have a greatly enhanced display quality.

Still another aspect of the present invention is to provide a liquid crystal panel assembly and a LCD apparatus having the same, which can realize a high-energy efficiency.

Also another aspect of the present invention is to provide a liquid crystal panel assembly and a LCD apparatus having the same, which can more effectively emit heat of high temperature generating from a light emitting diode (LED) light source of a backlight module.

According to one aspect of an exemplary embodiment of the present invention, there is provided a liquid crystal panel assembly comprising a liquid crystal panel, a backlight module having at least one LED light source which irradiates light to the liquid crystal panel, and a housing which surrounds the liquid crystal panel and the backlight module, wherein at least a portion of the housing adjacent to the at least one LED light source is formed of a thermal-conductive material.

The housing may comprise a front housing part which exposes a screen of the liquid crystal panel to the outside, and a rear housing part arranged at a rear side of the backlight module, and the rear housing part may be formed of a thermal-conductive material.

The rear housing part may be arranged to surround the at least one LED light source.

The backlight module may further comprise a light guide plate which guides light from the at least one LED light source, a diffusing plate which diffuses light from the light guide plate to the liquid crystal panel, and a reflecting plate which reflects light from the light guide plate to the diffusing plate.

The at least one LED light source of the backlight module may comprise a pair of LED light sources arranged symmetrically to each other at both sides of the light guide plate.

According to another aspect of an exemplary embodiment of the present invention, there is provided a LCD apparatus comprising a liquid crystal panel assembly comprising a liquid crystal panel, and a backlight module having at least one LED light source which irradiates light to the liquid crystal panel, and a frame to which the liquid crystal panel assembly is mounted, wherein at least a portion of the frame adjacent to the at least one LED light source is formed of a thermal-conductive material.

The frame may comprise a front frame part which exposes a screen of the liquid crystal panel to the outside, and a rear frame part arranged behind the front frame part, and the rear frame part may be formed of a thermal-conductive material.

The rear frame part may be formed of a thermal and electric-conductive material.

The liquid crystal panel assembly may further comprise a housing which surrounds the liquid crystal panel and the backlight module, and at least a portion of the housing adjacent to the at least one LED light source may be formed of a thermal-conductive material.

The housing may comprise a front housing part which exposes a screen of the liquid crystal panel to the outside, and a rear housing part arranged at a rear side of the backlight module, and the rear housing part may be formed of a thermal-conductive material.

The rear housing part may be arranged to surround the at least one LED light source.

The rear housing part may be in contact with the frame.

According to also another aspect of an exemplary embodiment of the present invention, there is provided a LCD apparatus comprising a liquid crystal panel assembly comprising a liquid crystal panel, and a backlight module having at least one LED light source which irradiates light to the liquid crystal panel, and a frame to which the liquid crystal panel assembly is mounted, the frame being formed of a thermal-conductive material.

Other aspects and features of the invention will become apparent to those skilled in the art from the following detailed description, which, taken in conjunction with the annexed drawings, discloses exemplary embodiments of the invention.

BRIEF DESCRIPTION OF THE DRAWINGS

These and/or other aspects of certain exemplary embodiments of the present invention will become apparent and more readily appreciated from the following description of the exemplary embodiments, taken in conjunction with the accompanying drawings of which.

DETAILED DESCRIPTION OF EXEMPLARY EMBODIMENTS OF THE PRESENT INVENTION

Figure 1:
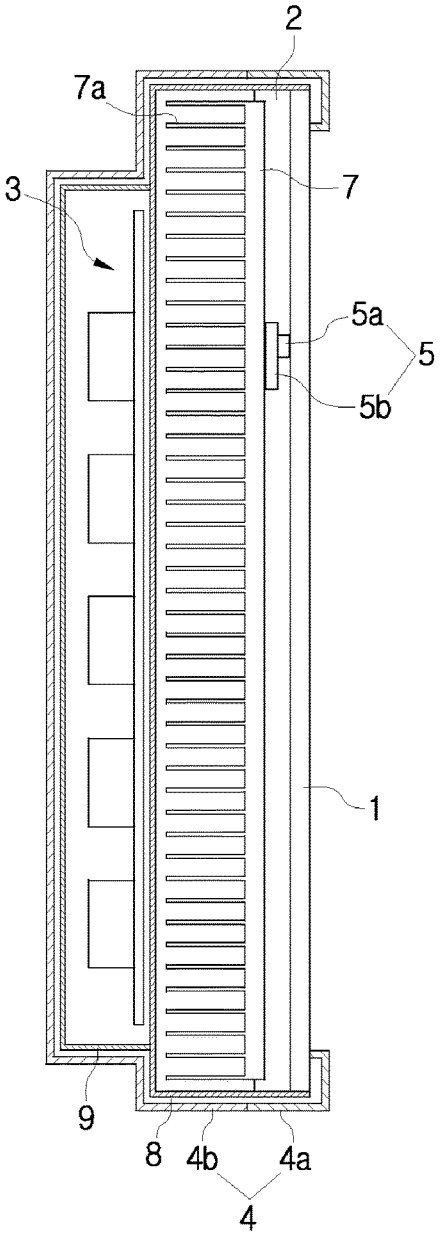
FIG. 1 (PRIOR ART)
FIG. 1 is a side section view exemplifying a related art LCD apparatus.

Reference will now be made in detail to the exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
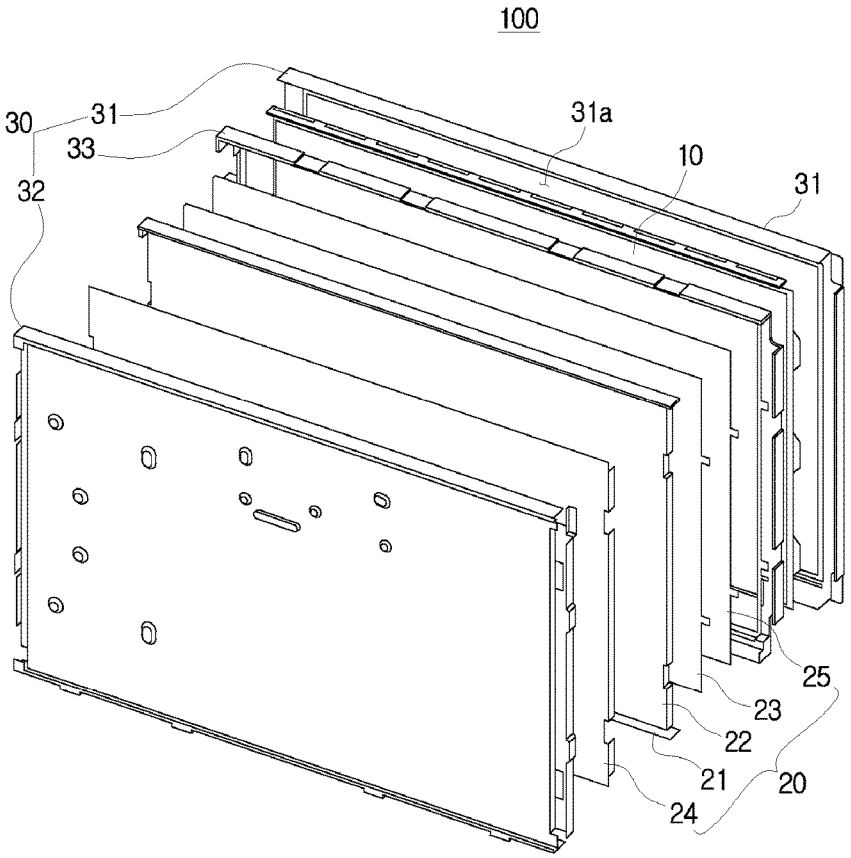
FIG. 2 is an exploded perspective view exemplifying a liquid crystal panel assembly in accordance with an exemplary embodiment of the present invention.
Figure 3:
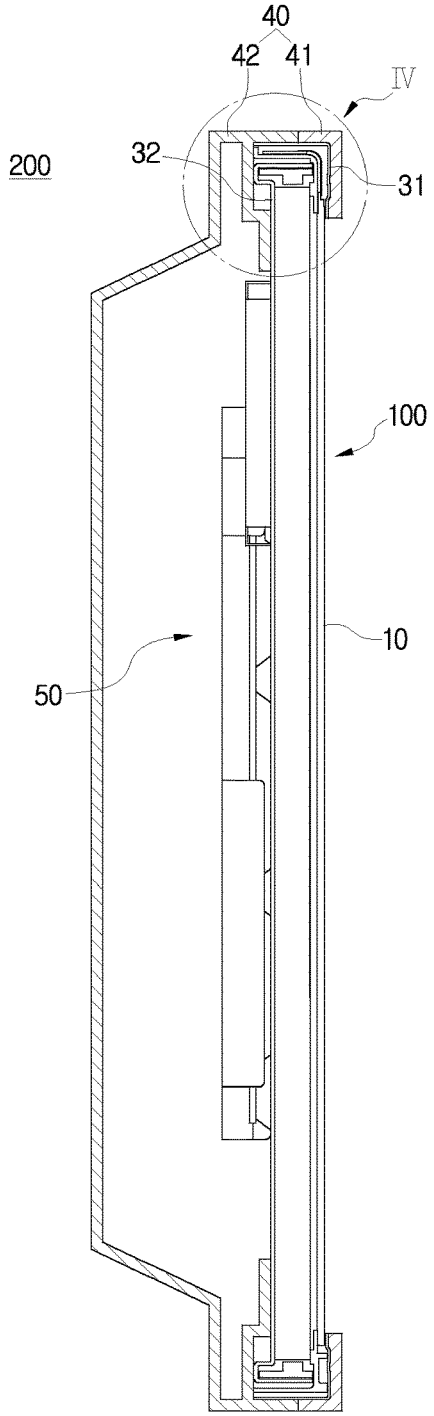
FIG. 3 is a cross section view exemplifying a LCD apparatus in accordance with another exemplary embodiment of the present invention.
Figure 4:
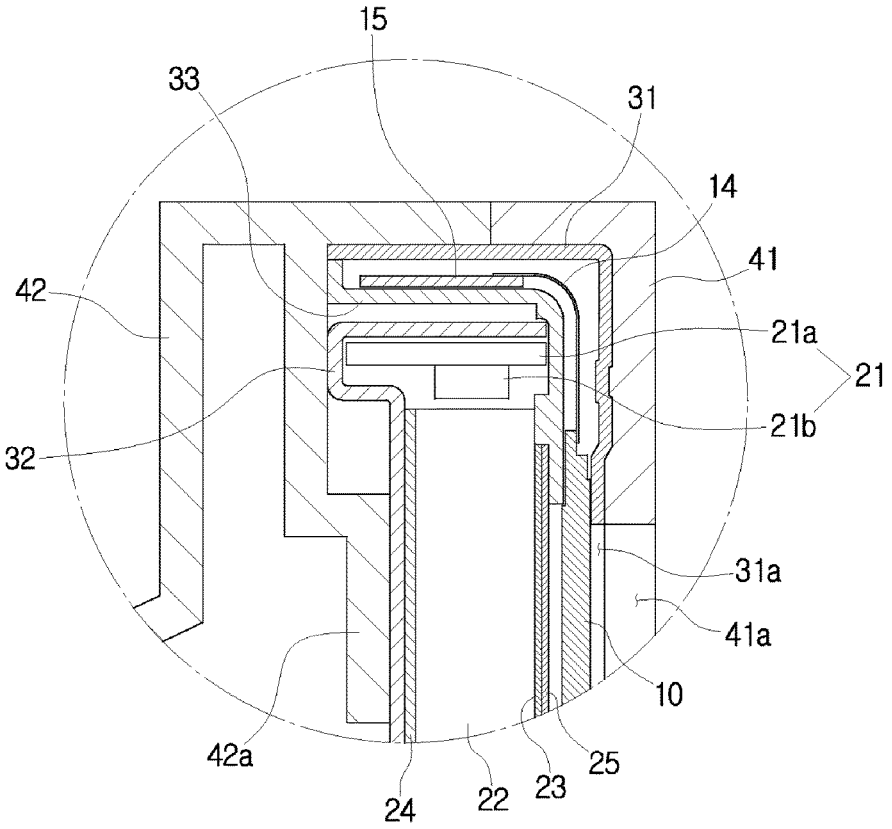
FIG. 4 is a magnified cross section view of a portion IV of FIG. 3.

FIG. 2 exemplifies a liquid crystal panel assembly in accordance with an exemplary embodiment of the present invention, and FIGS. 3 and 4 exemplify a liquid crystal display (LCD) apparatus in accordance with another exemplary embodiment of the present invention to which the liquid crystal panel assembly is applied.

As illustrated in the drawings, the liquid crystal panel assembly 100 in accordance with an exemplary embodiment of the present invention includes a liquid crystal panel 10, a backlight module 20 to irradiate light to the liquid crystal panel 10, and a housing 30.

The liquid crystal panel 10 may be one of various types of liquid crystal panels, which has a pair of substrates arranged in a minutely spaced-apart relation to each other, a liquid crystal interposed in a space between the pair of substrates, etc.

The backlight module 20 is provided with at least one light emitting diode (LED) light source 21, a light guide plate 22 to guide light from the LED light source 21, a diffusing plate 23 to diffuse light from the light guide plate 22 to the liquid crystal panel 10, and a reflecting plate 24 arranged at a rear side of the light guide plate 22.

The LED light source 21 includes a circuit board 21a, and a plurality of LEDs 21b mounted on the circuit board 21a. The respective LEDs 21b irradiate light in a lateral direction of the light guide plate 22, the light guide plate 22 leads light from the respective LEDs 21b to the diffusing plate 23, and the diffusing plate 23 diffuses light conveyed from the light guide plate 22 to the liquid crystal panel 10. The reflecting plate 24, which is arranged at an opposite surface to a light emitting surface of the light guide plate 22, reflects and guides light led onto the opposite surface of the light guide plate 22 toward the diffusing plate 23.

According to an exemplary embodiment of the present invention, the LED light source 21 is configured, such that as illustrated in FIGS. 2 and 3, a pair of LED light sources are arranged at both ends, e.g., upper and lower ends, of the light guide plate 22, respectively, thereby uniformly conveying light all over the light guide plate 22.

However, the present invention does not limit the number and the arrangement of the LED light source 21. For instance, instead of arranging the pair of LED light sources 21 at both ends of the light guide plate 22 as illustrated in FIGS. 2 and 3, a single LED light source (not shown) can be arranged at the middle of the backlight module 20.

Also, a condensing sheet 25 is interposed between the diffusing plate 23 and the liquid crystal panel 10. The condensing sheet 25 functions to condense light diffused by the diffusing plate 23 into an image area of the liquid crystal panel 10, like, e.g., a prism sheet, a high brightness film, etc.

If a prism sheet is used as the condensing sheet 25, it does not transmit an S wave, thereby reducing a light efficiency even though a P wave is transmitted. Thus, a high brightness film such as a dual brightness-enhanced film (DBEF) may be used as the condensing sheet 25.

Such a high brightness film, as an improved reflective polarizer to reduce a loss of light as generated in the prism sheet, converts a direction of an S wave component into the same direction as that of a P wave component to reduce a loss of the S wave, thereby increasing a brightness.

The housing 30 is arranged to surround the liquid crystal panel 10 and the backlight module 20, either contacting with or being adjacent to but without contacting with the LED light source 21 of the backlight module 20 at a portion thereof. The housing 30 includes a front housing part 31 formed to expose an effective display area of a screen of the liquid crystal panel 10 to the outside, and a rear housing part 32 arranged behind the front housing part 31.

The front housing part 31 has an opening 31a to expose the effective display area of the screen of the liquid crystal panel 10 to the outside.

Figure 5:
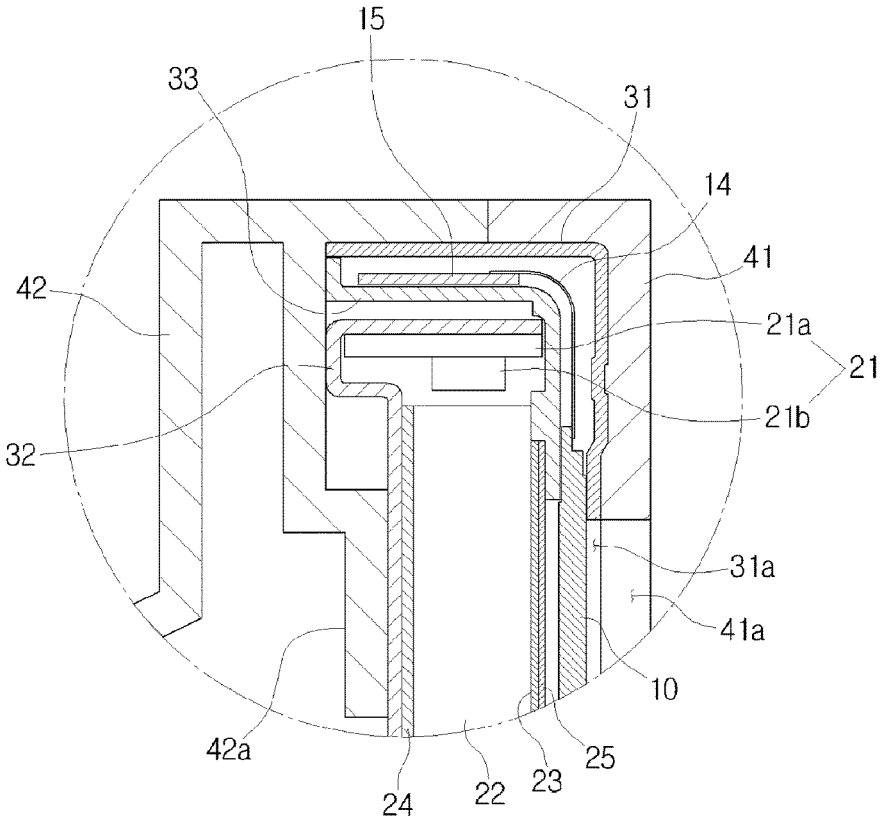
FIG. 5 is a magnified cross section view of a portion [VI] *IV* of FIG. 3 showing the rear housing part in contact with the LED light source.

The rear housing part 32 is mounted at a rear side of the backlight module 20, so that it is arranged to be either in contact or adjacent to, but not being in contact with the LED light source 21 of the backlight module 20 (see FIGS. 4 and 5).

The rear housing part 32 is formed of a thermal-conductive material such as Al, Zr-electroplated steel, Cu, graphite, thermal-conductive plastic, etc. so as to facilitate an emission of heat of high temperature generating from the LED light source 21 therethough.

The rear housing part 32 may be configured in a shape to surround the LED light source 21 to more facilitate the emission of the heat of high temperature generating from the LED light source 21.

Referring to FIG. 4, the front and the rear housing parts 31 and 32 are interconnected by a frame-shaped connecting bracket 33. A driving circuit board 15 for liquid crystal is disposed between the connecting bracket 33 and the front housing part 31, and connected to the liquid crystal panel 10 through a flexible board 14 to drive and control a pixel capacity of the liquid crystal panel 10.

Similarly to the rear housing part 32, the connecting bracket 33 is formed of a thermal-conductive material.

The LCD apparatus 200 in accordance with another exemplary embodiment of the present invention includes a liquid crystal panel assembly 100 as described above, and a frame 40 to which the liquid crystal panel assembly 100 is mounted.

The frame 40 is provided with a front frame part 41 to which the liquid crystal panel 10 is mounted to expose an effective display area of the screen thereof to the outside, and a rear frame part 42 mounted at a rear side of the liquid crystal panel assembly 100.

The front frame part 41 has an opening 41a corresponding to the opening 31a of the front housing part 31 so as to expose the effective display area of the screen of the liquid crystal panel 10 to the outside.

The rear frame part 42 is in contact with the rear housing part 32 which is in contact with the LED light source 21 of the liquid crystal panel assembly 100.

The rear frame part 42 is formed of a thermal and electric-conductive material such as Al, Zr-electroplated steel, Cu, etc.

The rear frame part 42 at an inner side thereof may have a contact part 42a to be in contact with and support the rear housing part 32 of the liquid crystal panel assembly 100. With the rear frame part 42 and the rear housing part 32 being in contact with each other, the heat of high temperature generating from the LED light source 21 can be more effectively emitted to the outside through the rear frame part 42 and the rear housing part 32.

Between the rear frame part 42 and the rear housing part 32 is interposed a controller 50. The controller 50 includes a power supply to control a supply of electric power, an inverter, a main control board to control all sorts of controlling and driving signals for the LCD apparatus 200, all sorts of electric elements and sensors, etc., which are not shown in the drawings, and controls a whole operation of the LCD apparatus 200.

As previously noted, being formed of the thermal and electric-conductive material such as Al, Zr-electroplated steel, Cu, etc, and arranged behind the controller 50, the rear frame part 42 also has an electromagnetic wave shield function which effectively intercepts electromagnetic waves generating from the controller 50 during the operation.

According to the exemplary embodiments of the present invention as described above, the rear housing part 32 and/or the rear frame part 42 are formed of the thermal-conductive material. Accordingly, the heat of high temperature generating from the LED light source 21 can be more effectively emitted to the outside, thereby reducing a heating temperature of the LED light source 21. Thus, the display quality of the liquid crystal panel assembly and the LCD apparatus as well as the brightness of the LED light source 21 can be enhanced.

Further, according to the exemplary embodiments of the present invention, as the heat generating from the LED light source 21 is effectively emitted to the outside as described above, the liquid crystal panel assembly and the LCD apparatus can minimize the consumption of electric power, thereby maximizing the energy efficiency.

Also, according to the exemplary embodiments of the present invention, the liquid crystal panel assembly and the LCD apparatus is configured, such that a structure of emitting the heat from the LED light source 21 is simplified as described above. Accordingly, the liquid crystal panel assembly and the LCD apparatus can be embodied to have a more-compacted size.

Also, according to the exemplary embodiments of the present invention, the rear frame part 42 is formed of the thermal and electric-conductive material so as to intercept the electromagnetic waves generating from the controller 50. Accordingly, the LCD apparatus does not need a separate electromagnetic wave shield structure.

Although a few exemplary embodiments of the present invention have been generally shown and described, it will be appreciated by those skilled in the art that changes may be made in these exemplary embodiments without departing from the principles and spirit of the invention, the scope of which is defined in the appended claims and their equivalents.

What is claimed is:

[1. A liquid crystal panel assembly comprising:

a liquid crystal panel;

a backlight module having at least one light emitting diode (LED) light source which irradiates light to the liquid crystal panel and a light guide plate which guides light from the at least one LED light source; and a housing which surrounds the liquid crystal panel and the backlight module, wherein at least a portion of the housing is formed of a thermal-conductive material, and wherein the housing is arranged to be in contact with a circuit board of the at least one LED light source so that heat is transmitted from the circuit board of the at least one LED light source to the housing.]

[2. The liquid crystal panel assembly as claimed in claim 1, wherein the housing comprises a front housing and a rear housing, and the rear housing is formed of the thermal-conductive material.]

[3. The liquid crystal panel assembly as claimed in claim 2, wherein at least a portion of the rear housing near the at least one LED light source is formed of the thermal-conductive material.]

[4. The liquid crystal panel assembly as claimed in claim 1, wherein the housing comprises a front housing and a rear housing, and the rear housing is arranged to be in contact with the circuit board of the at least one LED light source so that heat is transmitted from the circuit board of the lat least one LED light source to the rear housing.]

[5. The liquid crystal panel assembly as claimed in claim 4, wherein the rear housing is arranged to be in indirect contact with the circuit board of the at least one LED light source so that heat is transmitted from the circuit board of the lat least one LED light source to the rear housing.]

[6. A liquid crystal panel assembly comprising:

a liquid crystal panel;

a backlight module having at least one light emitting diode (LED) light source which irradiates light to the liquid crystal panel and a light guide plate which guides light from the at least one LED light source; and a front housing and a rear housing which surround the liquid crystal panel and the backlight module, wherein at least a portion of the rear housing near the at least one LED light source is formed of a thermal-conductive material, and wherein the rear housing is arranged to be in contact with a circuit board of the at least one LED light source so that heat is transmitted from the circuit board of the at least one LED light source to the rear housing.]

[7. The liquid crystal panel assembly as claimed in claim 6, wherein the rear housing is arranged to be in indirect contact with the circuit board of the at least one LED light source so that heat is transmitted from the circuit board of the lat least one LED light source to the rear housing.]

[8. A liquid crystal panel assembly comprising:

a liquid crystal panel;

a frame to which the liquid crystal panel is mounted, wherein a least a portion of the frame is formed of a first thermal-conductive material;

a backlight module having at least one light emitting diode (LED) light source which irradiates light to the liquid crystal panel and a light guide plate which guides light from the at least one LED light source; and a housing which surrounds the liquid crystal panel and the backlight module, wherein at least a portion of the housing is formed of a second thermal-conductive material, and wherein the housing is arranged to be in contact with a circuit board of the at least one LED light source so that heat is transmitted from the circuit board of the at least one LED light source to the housing.]

[9. The liquid crystal panel assembly as claimed in claim 8, wherein the housing comprises a front housing and a rear housing, and the rear housing is formed of the second thermal-conductive material.]

[10. The liquid crystal panel assembly as claimed in claim 8, wherein the housing comprises a front housing and a rear housing, and at least a portion of the rear housing near the at least one LED light source is formed of the second thermal-conductive material.]

[11. The liquid crystal panel assembly as claimed in claim 8, wherein the housing comprises a front housing and a rear housing, and the rear housing is arranged to be in contact with the circuit board of the at least one LED light source so that heat is transmitted from the circuit board of the at least one LED light source to the rear housing.]

[12. The liquid crystal panel assembly as claimed in claim 11, wherein the rear housing is arranged to be in indirect contact with the circuit board of the at least one LED light source so that heat is transmitted from the circuit board of the at least one LED light source to the rear housing.]

*13. An electronic apparatus comprising:*

*a liquid crystal panel;*

*a backlight module including a plurality of light emitting diodes (LEDs) to irradiate light to the liquid crystal panel via a light guide plate, the plurality of LEDs mounted to a LED circuit member;*

*a thermal-conductive backlight housing to support the backlight module, the LED circuit member is mounted to the thermal-conductive backlight housing;*

*a thermal-conductive frame which forms an external appearance of the electronic apparatus and surrounds the thermal-conductive backlight housing; and*

*a plurality of electronic components disposed between the thermal-conductive backlight housing and the thermal-conductive frame.*

*14. The electronic apparatus according to claim 13, wherein the LED circuit member is mounted to the housing such that heat generated by the LEDs transfers to at least a portion of the thermal-conductive housing.*

*15. The electronic apparatus according to claim 13, wherein the plurality of electronic components are disposed between a rear surface of the housing and a front surface of the frame.*

*16. The electronic apparatus according to claim 15, wherein the frame is formed of an electric-conductive material so as to intercept electromagnetic waves generated from the electronic components.*

*17. The electronic apparatus according to claim 16, wherein the electric-conductive material includes aluminum.*

*18. The electronic apparatus according to claim 15, wherein the plurality of electronic components comprise a drive circuit to drive the liquid crystal panel.*

*19. The electronic apparatus according to claim 15, wherein the plurality of electronic components comprise a power supply to supply electric power.*

*20. The electronic apparatus according to claim 15, wherein the plurality of electronic components comprise an inverter.*

* * * * *